(12) United States Patent
Liu

(10) Patent No.: US 8,733,032 B2
(45) Date of Patent: *May 27, 2014

(54) INDOOR TEMPERATURE-CONTROLLED DECORATIVE PANEL WITH ENVIRONMENTAL PROTECTION

(75) Inventor: Xudong Liu, Wenzhou (CN)

(73) Assignees: Xudong Liu, Wenzhou (CN); Geng Liu, Wenzhou (CN); Ziyan Liu, Wenzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/505,638

(22) PCT Filed: Sep. 29, 2010

(86) PCT No.: PCT/CN2010/077444
§ 371 (c)(1),
(2), (4) Date: May 2, 2012

(87) PCT Pub. No.: WO2012/031410
PCT Pub. Date: Mar. 15, 2012

(65) Prior Publication Data
US 2012/0222368 A1 Sep. 6, 2012

(30) Foreign Application Priority Data
Sep. 8, 2010 (CN) .......................... 2010 1 0275710

(51) Int. Cl.
*E04B 1/82* (2006.01)
*E04B 1/74* (2006.01)
*E04B 1/84* (2006.01)

(52) U.S. Cl.
CPC .... *E04B 1/74* (2013.01); *E04B 1/84* (2013.01)

USPC .......................................... 52/144; 52/220.1

(58) Field of Classification Search
USPC ............... 52/144, 220.1, 220.3, 173.1, 407.5, 52/576, 782.1
See application file for complete search history.

(56) References Cited

U.S. PATENT DOCUMENTS

| 2,295,155 | A | * | 9/1942 | Brown et al. | ................. 264/240 |
| 3,143,637 | A | * | 8/1964 | Turner | ........................... 392/435 |
| 3,949,732 | A | * | 4/1976 | Reines | ........................... 126/597 |

(Continued)

FOREIGN PATENT DOCUMENTS

| CN | 101519905 | 9/2009 |
| CN | 101701489 | 5/2010 |

(Continued)

OTHER PUBLICATIONS

International Search Report for international application No. PCT/CN2010/077444, dated Jun. 16, 2011 (6 pages).

*Primary Examiner* — Basil Katcheves
(74) *Attorney, Agent, or Firm* — Hamre, Schumann, Mueller & Larson, P.C.

(57) ABSTRACT

An indoor environmental protection and temperature controlling decoration board comprises a front panel, a back panel, valves, a pipe of a temperature controlling device and seal components. Fixing pins with pawls are assembled on the back panel to fix the decoration board conveniently on the inner wall of building. The decoration board also comprises a sealed cavity with water/air inlet groove and outlet groove to supplying heat or cold air into the room, and the sealed cavity is formed by a heat dissipation layer, an insulating layer and separating beams.

6 Claims, 1 Drawing Sheet

(56) References Cited

U.S. PATENT DOCUMENTS

| | | | |
|---|---|---|---|
| RE29,517 E * | 1/1978 | Becker | 52/144 |
| 4,090,496 A * | 5/1978 | Mallet | 126/565 |
| 4,143,705 A * | 3/1979 | Awalt, Jr. | 165/48.2 |
| 4,299,200 A * | 11/1981 | Spencer | 126/584 |
| 4,303,125 A | 12/1981 | Vahlbrauk | |
| 4,323,054 A * | 4/1982 | Hummel | 126/631 |
| 4,584,987 A * | 4/1986 | Rotili | 126/514 |
| 6,220,523 B1 * | 4/2001 | Fiedrich | 237/69 |
| 6,330,980 B1 * | 12/2001 | Fiedrich | 237/69 |
| 7,810,491 B2 * | 10/2010 | Benvenuti | 126/653 |

FOREIGN PATENT DOCUMENTS

| | | |
|---|---|---|
| CN | 201802021 | 4/2011 |
| DE | 19722029 | 12/1998 |
| EP | 1741996 | 1/2007 |

* cited by examiner

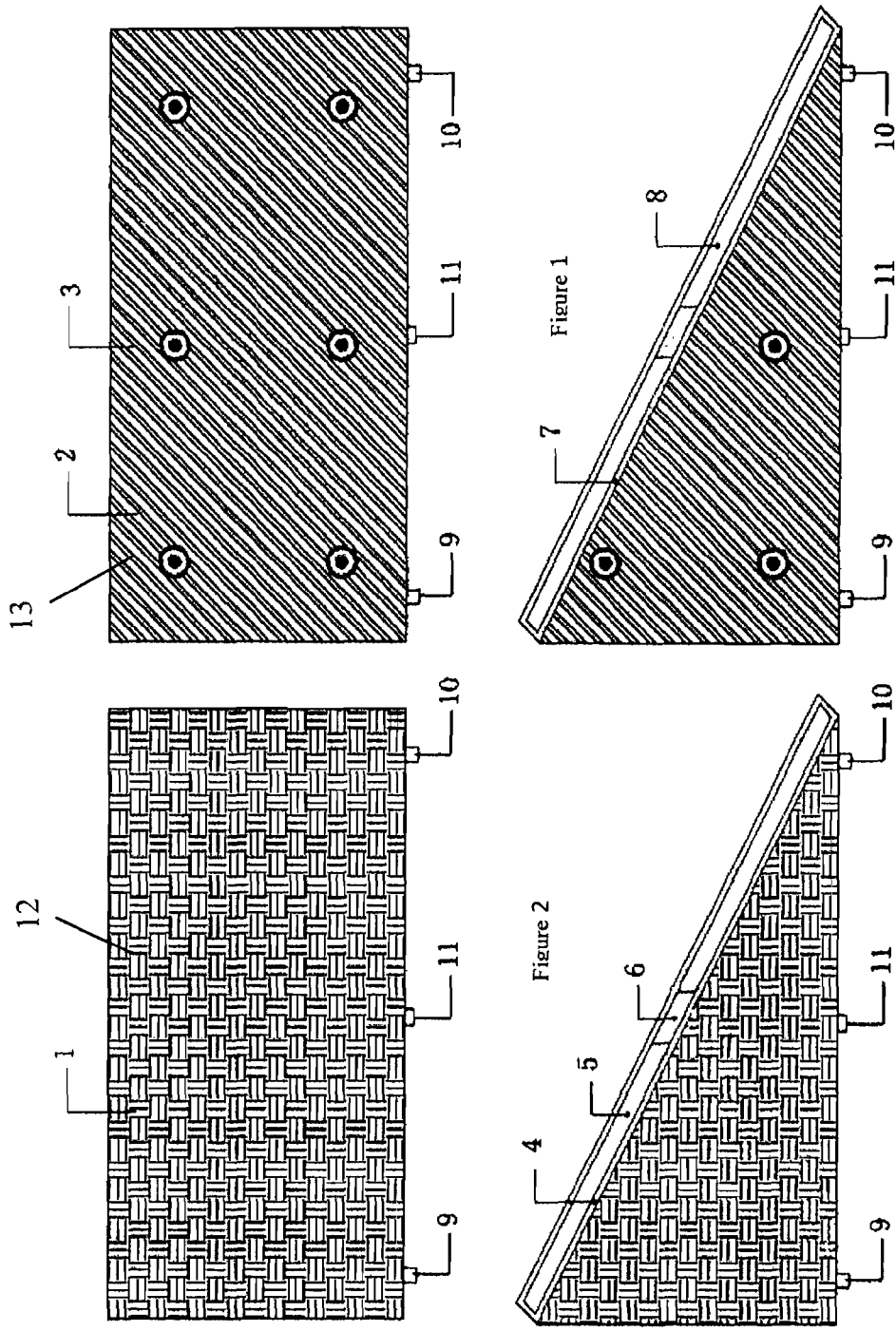

INDOOR TEMPERATURE-CONTROLLED DECORATIVE PANEL WITH ENVIRONMENTAL PROTECTION

TECHNOLOGICAL FIELD OF THIS INVENTION

The present invention relates to one kind of Indoor Temperature-Controlled Decorative Panel with Environmental Protection, which belongs to the field of building materials.

TECHNOLOGICAL BACKGROUND OF THIS INVENTION

Nowadays, most of the inside wall surfaces of buildings are made of fiber decorative panel, mineral wool clapboard, plasterboard, artificial panel, ceramic tile, marble or granite, in which there are many deficiencies such as heavy weight, breaking easily them to pieces, and wasting time and money in the construction, poor decorative and sound-absorbing effects, moreover it is harmful to the indoor environment and people's health from fiber and micro-dust caused by them.

The decorative panel on the inside wall has currently the single function without temperature-control, so people can only use air-conditioner to control and adjust the indoor air and temperature, which is bad for protecting-environment and saving-energy.

DESCRIPTION OF THIS INVENTION

This invention is to offer an indoor temperature-controlled decorative panel with environmental protection, which has favorable diathermancy, equispaced fluid, decorative and sound-absorbing effects, green environmental protection and convenient installation, and supplies the indoor heat or cool.

Technical scheme of this invention: is an indoor temperature-controlled decorative panel with environmental protection, which includes faceplate, backplane, valve, and pipe of temperature controller, seal components, and the fixed pawl nail which is set on the backplane.

The faceplate is set on the surface of diffuse temperature layer, the surface of faceplate has the decorative net veins, the backplane is set on the surface of heat preservation layer, and the surface of backplane has the sound-absorbing lines as mentioned above.

The diaphragm links the diffuse temperature layer and the heat preservation layer that form an enclosed cavum with the water and air penetrating, and draining grooves, there are the sealing component and pipe of temperature controller set as mentioned above.

The water and air penetrating groove connects the interface joint of water and air penetrating valve, and the water and air draining groove connects the interface joint of water and air draining valve as mentioned above.

Both joints of water and air penetrating valve and draining valve link the water and air supply pipelines respectively as mentioned above.

ACTIVE AND BENEFICIAL EFFECTS OF THIS INVENTION

1. The diffuse temperature layer, heat preservation layer and diaphragm form the enclosed cavum with the water and air penetrating groove and draining groove, there are the solar hot water or the chemical material solution within the cavum, where the temperature is controlled by the temperature controller combined with the underground well water; it has favorable diathermancy, equispaced fluid, supplies the indoor heat or cool, all of these make people feel comfortable in every season, and are good for people's health.

2. The fixed pawl nail is set on the backplane that is convenient for inserting and joining grout on the inside wall of building, and magnetic orientation, so that it is easy and firm for installation, and accurate for orientation;

3. Water and air penetrating valve and draining valve link automatically the temperature controller to adjust the cool and heat that make the indoor temperature control automatically, which is convenient to interface the water and air supply pipelines of building, offers the water or gas heating and cooling.

4. It has excellent fireproofing, decorative and sound-absorbing effects, no fiber and dust pollution, is green environmental protection, and non-toxic and harmless for the indoor environment and people's health.

5. Specifications and sizes have the standard series that can be installed free according to the indoor wall size of building, can be used as the indoor air conditioner with cool and heat, so as to realize the environment-protecting and energy-saving effects; also can be put together according to the size required, can be used as the fireproofing ceiling, clapboard, and board for the indoor decoration, can be flushed by water, and achieve the fabulous effects such as low decorative costs, high mechanical strength and permanent endurableness.

DESCRIPTION OF THE ATTACHED DRAWINGS

FIG. 1 Front View of Structural Diagram in This Invention;
FIG. 2 Back View of Structural Diagram in This Invention;
FIG. 3 Sectional View of FIG. 1;
FIG. 4 Sectional View of FIG. 2.

MEANS OF DETAILED IMPLEMENTATION

FIGS. 1, 2, 3 and 4 are shown as the reference, one kind of Indoor Temperature-Controlled Decorative Panel with Environmental Protection includes mainly faceplate 1, backplane 2, fixed pawl nail 3, diffuse temperature layer 4, water and air penetrating groove 5, diaphragm 6, heat preservation layer 7, water and air draining groove 8, the interface joint of water and air penetrating valve 9, the interface joint of water and air draining valve 10, pipe of temperature controller 11, seal components, and so forth; among them, the faceplate 1 is made of layered copper, iron and aluminum alloy, is set on the surface of diffuse temperature layer 4, which is made from xalloy, the surface of faceplate 1 has the decorative net veins 12, which play the role of heat radiation and decoration; backplane 2 is made from the split and synthesis of iron resin fibers, and set on the surface of heat preservation layer 7, the surface of backplane 2 has the sound-absorbing lines 13 which play the role of heat preservation and sound-absorption, the fixed pawl nail 3 is set on the backplane 2, is utilized to insert, join and fix the grout of the building inside wall in installation.

The xalloy diaphragm 6 links the diffuse temperature layer 4 and the heat preservation layer 7 mentioned above that form an enclosed cavum with the water and air penetrating groove 5, and the water and air draining groove 8, furthermore the seal components and pipe of temperature controller 11 are set in it, there are the solar hot water or the chemical material solution within the cavum, where the temperature is controlled by the temperature controller combined with the underground well water; pipe of temperature controller 11 uses the existing technology or can be purchased; the water and air penetrating groove 5 links with the interface joint of water and air penetrating valve 9, the water and air draining groove 8 links with the interface joint of water and air draining valve 10, the interface joint of water and air penetrating valve 9 and the interface joint of water and air draining valve 10 mentioned above link the water and air supply pipelines of building respectively, which are suitable for water or gas heating and cooling. The heat preservation layer 7 mentioned above is made from the resin fiber by the thermal bonding and moulding.

The invention claimed is:

1. An indoor temperature-controlled decorative panel with environmental protection comprising:
    a faceplate;
    a back plate; and
    one or more pawl nails provided on an outer surface of the back plate,
    wherein the faceplate and the back plate are arranged generally parallel to each other and have respective peripheries joined together to form a closed space,
    wherein the pawl nails are configured to fix the panel on a wall surface of a building, and
    wherein the faceplate is disposed on a surface of a diffuse temperature layer, a surface of the faceplate has decorative net veins, the back plate is disposed on a surface of a heat preservation layer, and a surface of the back plate has sound-absorbing lines.

2. The indoor temperature-controlled decorative panel with environmental protection of claim 1, wherein a diaphragm links the diffuse temperature layer and the heat preservation layer to form an enclosed cavum with a water and air penetrating groove and a water and air draining groove, seal components and a pipe of temperature controller are provided for the grooves.

3. The indoor temperature-controlled decorative panel with environmental protection of claim 2, wherein the water and air penetrating groove links with an interface joint of a water and air penetrating valve, the water and air draining groove links with an interface joint of a water and air draining valve.

4. The indoor temperature-controlled decorative panel with environmental protection of claim 3, wherein the interface joint of the water and air penetrating valve and the interface joint of the water and air draining valve link water and air supply pipelines of the building, respectively.

5. The indoor temperature-controlled decorative panel with environmental protection of claim 1, wherein the respective periphery of the faceplate and the respective periphery of the back plate that are joined are flush with each other.

6. The indoor temperature-controlled decorative panel with environmental protection of claim 1, wherein the pawl nails are configured to insert into a grout of the wall surface and join the grout when the panel is fixed on the wall surface.

* * * * *